US006596787B1

(12) United States Patent
Levandoski et al.

(10) Patent No.: US 6,596,787 B1
(45) Date of Patent: Jul. 22, 2003

(54) NON-YELLOWING FAST CURE SPEED UV\VISIBLE CURABLE LIQUID ACRYLIC ESTER ADHESIVES FOR GLASS BONDING

(75) Inventors: Susan Levandoski, Bristol, CT (US); JoAnn DeMarco, Wethersfield, CT (US)

(73) Assignee: Henkel Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/773,690

(22) Filed: Feb. 2, 2001

(51) Int. Cl.$^7$ ............... C08F 2/46; C08F 2/50
(52) U.S. Cl. ............ 522/96; 522/97; 522/109; 522/110; 522/71; 522/77; 522/83; 522/181; 522/180; 522/113; 522/120; 522/121; 522/92; 522/134; 522/137; 522/141; 522/142; 522/143
(58) Field of Search ............... 522/96, 97, 109, 522/110, 71, 77, 83, 181, 180, 113, 120, 121, 92, 134, 137, 141, 142, 143; 428/425.6

(56) References Cited

U.S. PATENT DOCUMENTS

| | | | | |
|---|---|---|---|---|
| 5,017,433 A | * | 5/1991 | Chevreux et al. | 428/425.6 |
| 5,093,386 A | * | 3/1992 | Bishop et al. | 522/96 |
| 5,658,672 A | * | 8/1997 | Lenke et al. | 428/423.1 |
| 5,908,873 A | * | 6/1999 | Shustack | 522/39 |
| 5,908,878 A | | 6/1999 | Baity et al. | 523/203 |
| 6,014,488 A | | 1/2000 | Shustack | 385/128 |
| 6,080,483 A | * | 6/2000 | Szum et al. | 428/378 |
| 6,085,010 A | * | 7/2000 | Zahora et al. | 385/114 |
| 6,316,105 B1 | * | 11/2001 | Khudyakov et al. | 428/378 |
| 6,335,149 B1 | * | 1/2002 | Xu et al. | 430/321 |
| 6,440,519 B1 | * | 8/2002 | Takase et al. | 428/65.2 |

FOREIGN PATENT DOCUMENTS

JP   02248470   * 10/1990

* cited by examiner

*Primary Examiner*—James J. Seidleck
*Assistant Examiner*—Sanza L. McClendon
(74) *Attorney, Agent, or Firm*—Steven C. Bauman

(57) ABSTRACT

The present invention is directed to low intensity UV curable adhesives formulated using a blend of acrylate oligomers and monomers which are capable of bonding glass, provide improved low-yellowing properties and fast cure speed over current glass bonding adhesives, while maintaining good bond strength lo and durability comparable to, or better than, state-of-the-art glass bonding adhesives.

21 Claims, No Drawings

NON-YELLOWING FAST CURE SPEED UV\VISIBLE CURABLE LIQUID ACRYLIC ESTER ADHESIVES FOR GLASS BONDING

BACKGROUND OF THE INVENTION

Light curable liquid acrylic ester adhesives for glass bonding using low intensity ultraviolet ("UV") light are known. Such adhesives are useful for glass assembly and repair applications in which high intensity UV light is unavailable or impractical. Using such adhesives, broken glassware and decorative glass items can be rapidly bonded and fabricated using low intensity light sources which give output in the UV/visible wavelength region.

One problem associated with such known UV glass bonding adhesives is yellowing on storage and exposure to light during use. Another problem common with such adhesives is surface cure inhibition when cured under atmospheric conditions.

A number of fast curing low-yellowing acrylate functional oligomer products are known for use in UV/electron beam ("EB") curable printing inks and the like. However, such products typically have poor adhesive strength to glass.

It would be desirable to provide an improved low intensity UV/visible curable adhesive suitable for glass bonding which provides good adhesive strength, fast tack-free time and reduced yellowing than commercially available adhesives. Desirably such adhesives should also display good humidity resistance.

SUMMARY OF THE INVENTION

The present invention is directed to low intensity UV/visible curable adhesives which provide improved low-yellowing properties with fast fixture time at low UV intensity over current glass bonding adhesives. These adhesives maintain good bond strength and durability at least comparable to known UV acrylic glass bonding adhesives. The composition of the present invention includes:

a) an aliphatic polyether urethane acrylate oligomer having an average of least 2.5 acrylate groups per molecule, suitably in an amount of 50% 75% by weight of the total composition;

b) at least one of
  i) a combination of at least one aliphatic (poly)ester urethane diacrylate and at least one alkoxylated bisphenol A di(meth)acrylate; or
  ii) a urethane di(meth)acrylate of alkoxylated hydrogenated bisphenol A, suitably in an amount of 5%–70% by weight of the total composition;

c) a diluent (meth)acrylate ester having an ambient viscosity of about 100–5,000 cps, suitably in an amount of 5%–60% by weight of the total composition;

d) optionally an adhesion promoter, suitably in an amount of 0.2%–30% by weight of the total composition; and e) a photoinitiator component, suitably in an amount of 0.2%–10% by weight of the total composition.

A further aspect of the invention provides a method of glass bonding in which an adhesive composition is applied to at least one of a pair of glass substrates, and then the substrates are joined and subjected to low intensity UV radiation for sufficient time to fixture the adhesive.

DETAILED DESCRIPTION OF THE INVENTION

For purposes of the present invention low intensity UV radiation is radiation from a broad spectrum UV or a UV/visible source, having an intensity at 365 nm of about 6 milliwatts or less per square centimeter, at the substrate surface.

Component a)

The aliphatic polyether urethane acrylate compounds useful in the invention are suitably prepared by reacting an aliphatic diisocyanate with an aliphatic polyether polyol, at a ratio of about 2 or more isocyanate groups of the diisocyanate per hydroxyl group of the polyether polyol compound. The remaining isocyanate groups are then reacted with a suitable hydroxyalkyl acrylate compound to produce the acrylated oligomer. The reaction can also be run in reverse sequence, preparing acrylate functional isocyanate intermediates which are then used as capping agents for the polyether polyols. The polyether polyol has an average of at least 2.5 hydroxyl groups per molecule, typically 2.5–3.5 hydroxyl groups per molecule and preferably about 3 hydroxyl groups per molecule. The polyether repeat units may suitably be ethylene oxide (—$C_2H_4O$—), propylene oxide (—$C_3H_6O$—) or butylene oxide (—$C_4H_8O$—) repeat units, or mixtures thereof. In the foregoing, propylene includes n-propylene and isopropylene, and butylene includes 1,2-butylene, 1,3-buctylene, 2-methyl-1,3-propylene and 1,4-butylene. Preferred polyols may be propoxylated glycerol or propoxylated trimethylolpropane. Examples of suitable aliphatic diisocyanate include isophorone diisocyanate, methylene-bis-cyclohexane diisocyanate and 1,6-hexane diisocyanate. Examples of suitable hydroxy functional acrylate compounds include hydroxyethyl acrylate, hydroxypropyl acrylate and other diol monoacrylate esters. A desirable commercial acrylated aliphatic polyether urethane oligomer is PHOTOMER® 6019, sold by Henkel Corp., Ambler, Pa, reported in U.S. Pat. Nos. 5,908,873 and 6,014,488 to be an aliphatic urethane acrylate oligomer from polyether polyol, isophorone diisocyanate and hydroxyethyl acrylate. Mixtures of aliphatic polyether urethane acrylate compounds may be used as this component of the inventive formulation. This aliphatic polyether urethane acrylate component is employed at an amount of about 5% to about 70%, preferably 10–40%, by weight of the composition.

Component b)

The second component of the inventive compositions is a di(meth)acrylate oligomer component. The second component may be either a combination of an aliphatic polyester urethane diacrylate and an alkoxylated bisphenol A di(meth)acrylate, or a block (meth)acrylate terminated poly,ether urethane based on hydrogenated bisphenol A. This second component is suitably present in an amount from about 5% to about 70% by weight of the composition.

The aliphatic polyester urethane diacrylate suitably may, be an oligomeric compound having a viscosity at 160° F. (71° C.) of about 700 to 5,000 cps 1,000–5,000 mPa·s), preferably about 1,000 to about 2,500 cps (1,000–2,500 mPa·s). An example such compound is PHOTOMER® 6210 sold by Henkel Corp. The aliphatic polyester urethane diacrylate is suitably employed at an amount of about 15% to about 50%, such as 20–40%, by weight of the composition. Mixtures of aliphatic polyester urethane diacrylates may be employed.

The alkoxylated bisphenol A di(meth)acrylate compound is used in combination with the aliphatic polyester urethane diacrylate to enhance the adhesive strength of the cured formulation. Ethoxylated bisphenol A dimethacrylate compounds having 2–6 ethoxylate groups per molecule are preferred. The alkoxylated bisphenol A di(meth)acrylate compound is employed at an amount of about 5% to about 50%, preferably about 10% to about 15%, by weight of the composition.

The urethane di(meth)acrylate of hydrogenated bisphenol A may be prepared by reacting 2 moles of a diisocyanate with 1 mole of hydrogenated bisphenol A. The intermediate of this reaction is then reacted with 2 moles of 2-hydroxyethyl methacrylate to produce the desired methacrylate terminated polyurethane block resin. The diisocyanate is suitably an aromatic diisocyanate, desirably toluene diisocyanate. The block polyurethane diacrylate should be used in an amount of from about 5% to about 50% by weight of the composition.

Desirably the components a) and b), respectively are present in a relative weight ratio of from about 1:3 to about 3:1, such as about 1:1.

Component c)

Liquid diluent monomers which are liquid esters, preferably acrylate and methacrylate esters having a viscosity of 100–5,000 cps (100–5,000 mPa·s), preferably 100–4,000 cps (100–4,000 mPa·s), more preferably 100–2,000 cps 200–2,000 mPa·s), are desirable to provide a satisfactory viscosity to the inventive compositions. Suitably, such (meth)acrylate monomers include mono, di, or poly(meth) acrylate compounds, examples of which are β-carboxyethyl acrylate, isobornyl acrylate, n-octyl acrylate, n-decyl acrylate, cyclohexyl acrylate, 2-ethylhexyl acrylate, ethoxyethyl acrylate, ethoxylated phenyl monoacrylate hydroxyethyl acrylate, isooctyl acrylate, n-butyl acrylate, dipropylene glycol diacrylate, tetraethylene glycol diacrylate, 1,6-hexane diol diacrylate, tripropylene glycol diacrylate, glycerol triacrylate, trimethylol propane diacrylate, trimethylol propane triacrylate, pentaerythritol tetraacrylate, hydroxyethyl methacrylate, hydroxypropyl methacrylate, cyclohexyl methacrylate, glycerol monomethacrylate, glycerol 1,3-dimethacrylate, trimethyl cyclohexyl methacrylate, methyl triglycol methacrylate, and so forth. Some of these monomers may be found as viscosity or property modifiers in the commercial oligomer products. Mono(meth)acrylate monomers are desirable.

In general methacrylate monomers give harder scratch resistant films than acrylate monomers, but slow the cure rate. A mixture of acrylate and methacrylate monomers often achieve a satisfactory balance of formulation viscosity, cure speed and cured adhesive properties. Isobornyl acrylate is a particularly desirable monomer component as it has good low-color, low viscosity uncured properties, fast cure, relatively low shrinkage on curing and gives hard scratch and resistant films as compared to those obtained with methacrylate monomers alone. Additionally, the films also have good water resistance and adhesion characteristics. The diluent monomers are employed in an amount of about 5% to about 60% by weight of the composition, such as from about 10% to about 60% by weight of the composition. Desirable compositions employ mixtures of liquid acrylate or methacrylate diluents. For instance, desirable compositions might include 10–25% of a methacrylate ester diluent, such as hydroxyethyl methacrylate or hydroxypropyl methacrylate, and 5–25% of an acrylate ester diluent, such as isobornyl acrylate. Some compositions have from about 5% to about 25% by weight of the composition of a mixture of at least one acrylate and at least one methacrylate, such as about 10% to about 25% by weight of the composition of the blend.

Component d)

The compositions preferably also include one or more adhesion promoter compounds, suitably in an total amount of from about 0.5% to about 30%, preferably about 1–10%, by weight of the composition. Such compounds generally fall into two categories, acid functional monomers such as acrylic acid or methacrylic acid, and silane adhesion promoters. The silane adhesion promoters are silane or small siloxane oligomers which contain two or more hydrolyzable groups attached to silicon and at least one organic group which is a polar group and/or free-radically polymerizable. Examples of hydrolyzable groups are alkoxy groups such as methoxy or ethoxy groups, oximes, acetoxy groups, and amino groups. Examples of organic groups which are polar groups and/or free-radically polymerizable include vinyl, allyl, methacryloxypropyl, acryloxypropyl, glycidoxyethyl, glycidoxypropyl, mercaptopropyl, epoxycyclohexyl, haloalkyl, and alkyl groups having ketone, aldehyde, carboxylate, carboxylic acid, ureide, amide, or isocyanurate groups thereon. Specific examples of such compounds include glycidoxypropyltrimethoxysilane, methacryloxypropyltrimethoxysilane, methacryloxypropyltriacetoxysilane, and acryloxypropyltrimethoxysilane. Desirable compositions include 1–10% of an acid monomer, especially acrylic acid, and 1–5% of a silane adhesion promoter.

Component e)

A photoinitiator is used to render the composition light curable. Examples of photoinitiators, which initiate under a free radical mechanism, include benzophenone, acetophenone, chlorinated acetophenone, dialkoxyacetophenones, dialkylhydroxyacetophenones, dialkylhydroxyacetophenone esters, benzoin, benzoin acetate, benzoin alkyl ethers, dimethoxybenzoin, dibenzylketone, benzoylcyclohexanol and other aromatic ketones, acyloxime esters, acylphosphine oxides, acylphosphosphonates, ketosulfides, dibenzoyldisulphides, diphenyldithiocarbonate and diphenyl(2,4,6-trimethylbenzoyl) phosphine oxide. These photoinitiators are active in the UV/visible range, approximately 250–850 nm, and preferably in the range of 300 to 450 nm so that the compositions can be cured by exposure to low intensity UV. Particularly suitable photoinitiators include IRGACURE® 184, hydroxycyclohexyl phenyl ketone, available from Ciba Specialty Chemicals in Tarrytown, N.Y. and LUCIRIN® TPO, diphenyl-2,4,6-triphenylbenzoyl phosphine oxide available from BASF Corporation in Mount Olive, N.J. Typically, the photoinitiators will be employed in an amount of 0.2 to 10%, such as 1 to 6% and desirably 3–5% by weight of the composition.

The compositions of the invention may also include an inhibitor of polymerization in an amount effective to give desired shelf stability to the composition. Suitable inhibitors are well known to those skilled in the art and include those described in the aforementioned patents which described anaerobic compositions. Metal chelators, such as ethylenediamine tetraacetate ("EDTA") and 1-hydroxyethylidine-1, 1-diphosphonic acid ("HEDPA"), and quinone type inhibitors, such as hydroquinone, methyl hydroquinone, napthaquinone and benzoquinone, are exemplary. Such inhibitors are typically employed at a level of 0.1–1.0% by weight of the composition.

An improved glass bonding adhesive in accordance with the present invention, should include the following properties:

a. UV fixture time: 5 seconds at 6 mw/cm$^2$, 365 nm wavelength;
b. Color: Yellow Index≦10 for the initial cured film product, and Gardner Color:≦1 for uncured product;
c. Torque Strength:>70 ft-lb;
d. Durability on humidity aging at 120 F (49 C), 100% RH or 100° F. (38° C.), 100% RH; and
e. Surface cure: Tack free time (TFT) <80 sec., preferably<40 sec., at 50 mw/cm$^2$, 365 nm.

The invention is illustrated by the following non-limiting examples.

EXAMPLES

In these examples which the test methods used were as follows:

TEST METHODS

Except as noted below or in Tables I or II, the test assemblies comprising at least one glass plate were cured by irradiation through the glass plate using low intensity UV light source (a broad spectrum, 250–430 nm, UV source providing 6 milliwatts per cm$^2$ at 365 nm). The cured assemblies used in methods 1–3, below were produced by irradiating for 30 seconds.

1. Tensile Strength

The tensile force required to break an adhesive joint formed between a steel pin and a glass plate was determined in accordance with ASTM-D2095 using a tension testing machine equipped with a suitable load cell.

2. Torque Strength

The adhesive strength of the cured adhesive, using aluminum hex buttons bonded to glass specimens, was determined in accordance with ASTM-D3658 by stressing a torsional shear joint with the application of torsional force parallel to the bond area.

3. Durability on Humidity Aging

Test specimens prepared as in method 2, above, were placed in a controlled chamber at 120° F. (49° C.) and 100% relative humidity. The samples were removed after 100 hours and after 500 hours and tested using, method 2, above.

4. UV Fixture Time

The test specimens were made by hand by placing a small drop of the adhesive material on a clean dry glass microscope slide (76×26×1 mm) at room temperature and bonding a second glass slide to the first angled at between 30° and 90°. The specimens were then cured under a low intensity UV light source (broad spectrum source providing 6 milliwatts per cm$^2$ at 354 nm) for intervals of 4 to 5 seconds, applying a shear moment by hand after the cure interval. Fixture is determined when the assembly supports the shearing moment without relative movement of the two slides.

5. Surface Cure

The adhesive is applied to a glass slide and cured. The cured surface is dusted with talcum power. The surface is considered tack free if the talcum powder can be removed by light rubbing without causing the surface to become dull. Cure intervals of 10 seconds are used up to 30 seconds. Cure intervals of 15 seconds are used up to 120 seconds, if needed.

6. Yellow Index (YI)

Yellow index was measured on cured films with a Data Color International CS5 Chroma Sensor instrument following instruction manual procedures.

7. Gardner Color

The color of the uncured liquid formulation was determined against standard color comparison tubes obtained from Pacific Scientific Co., Silver Springs, Md., in accordance with ASTM-2849.

8. APHA Color Determination

The color of the uncured liquid formulation was determined against standard Pt-Co solutions, in accordance with ASTM-1209–79.

Examples 1–2, Comparative Examples A–C

Compositions were prepared using standard mixing methods with the ingredients as shown in Table Ia.

For the compositions found in Table Ia, the isobornyl acrylate, hydroxypropyl metbacrylate, ethoxylated bisphenol A dimethacrylate and PHOTOMER® 6019 and 6210 were added together and mixed for 30 minutes using standard laboratory mixers at room temperature. The acrylic acid, glycidoxypropyltrimethoxy silane, IRGACURE® 184 photoinitiator and stabilizer were added to the mixture and mixed for 30 another minutes.

Physical properties of cured and uncured compositions were compared to a commercially available UV acrylate glass bonding adhesive, LOCTITE® 358 (Comparative A), a product which gives good cure speed with low intensity UV irradiation, but with some yellowing. The Comparative A product does not include an aliphatic polyester urethane diacrylate or a urethane di(meth)acrylate of hydrogenated bisphenol A. Compositions B and C are further comparative formulations formulated respectively with one of components a) or b) of the invention, but not both. Compositions 1 and 2 are formulations of the invention.

Test results are given in Table Ib.

TABLE Ia

Glass Bonding Compositions

| Components | B (wt %) | C (wt %) | 1 (wt %) | 2 (wt %) |
|---|---|---|---|---|
| PHOTOMER ® 6019 | — | 48.0 | 30.5 | 17.5 |
| PHOTOMER ® 6210 | 48.0 | — | 30.5 | 43.6 |
| isobornyl acrylate | 9.6 | 9.6 | 8.7 | 8.7 |
| hydroxy propyl methacrylate | 19.1 | 19.1 | 8.7 | 8.7 |
| ethoxylated bisphenol A dimethacrylate | 15.3 | 15.3 | 13.3 | 13.3 |
| glycidoxypropyltrimethoxysilane | 1.7 | 1.7 | 1.7 | 1.7 |
| acrylic acid | 2.4 | 2.4 | 2.4 | 2.4 |
| IRGACURE ® 184[1] | 3.8 | 3.8 | 4 | 4 |
| complexing agent pre-mix[2] | 0.1 | 0.1 | 0.1 | 0.1 |

[1]IRGACURE ® 184-hydroxycyclohexyl phenyl ketone
[2]Complexing agent premix-VERSENOL ® 120, hydroxyethylethylenediaminetriacetic acid diluted in ethylene glycol and water to a concentration of 1.2%

TABLE Ib

Properties of Glass Bonding Compositions

| | Comparative | | | Invention | |
|---|---|---|---|---|---|
| Properties | A | B | C | 1 | 2 |
| Viscosity @ 25° C. (cPs) | — | — | — | 1295 | 1270 |
| Initial torque strength, FT-LB | 75 | 75–80 | 48 | 75 | 74 |
| Durability, % strength retained 1 wk @ 49° C., 100% RH | 46 | 60 | NA | 100 | 122 |
| Durability, % strength retained 2 wk @ 49° C., 100% RH | 40 | 45 | NA | 112 | 116 |

TABLE Ib-continued

Properties of Glass Bonding Compositions

|  | Comparative | | | Invention | |
|---|---|---|---|---|---|
| Properties | A | B | C | 1 | 2 |
| Fixture time, sec @ 6 mw/cm², 365 nm | 4–5 | 4–5 | >10 | 4–5 | 4–5 |
| Surface cure, tack free time, sec @ 50 mw/cm², 365 nm | >90 | >40 | 10 | 10 | 20 |
| Yellow Index cured film (60 mils) | 11 | 3.6 | 4.0 | 3.6 | 4.74 |
| Gardner color, uncured resin @ RT | 2–3 | <1 | <1 | <1 | <1 |
| Gardner color, after ageing 50° C. for 4 weeks[1] | 4–5 (cured) | <1 | <1 | <1 | <1 |

[1]Indicated measurement value is on uncured resin, except as noted where resin cured during aging.

The data in Table Ib demonstrate that the glass bonding compositions of the invention examples have good surface curing ability and provide a significant improvement on the cure speed and low color of uncured and cured resins while maintaining the desired adhesion performance to glass at low UV intensity. The inventive compositions also provide superior durability relative to the various comparative compositions.

Examples 3–5

For the compositions found in Table IIa, a solution of a polyurethane block resin was first prepared. The polyurethane block resin was prepared by reacting 2 moles of toluene diisocyanate with one mole of hydrogenated bisphenol A and reacting the resultant intermediate product with 2 moles of 2-hydroxyethylmethacrylate using standard procedures for the preparation of a polyurethane resin. The resultant polyurethane block resin was then mixed with 2-hydroxyethylmethacrylate, isobornyl methacrylate and hydroxypropyl methacrylate.

This solution was then added together with isobornyl acrylate and PHOTOMER® 6019 and mixed for 30 minutes using standard laboratory mixers at room temperature. The acrylic acid, glycidoxypropyltrimethoxysilane, photoinitiators (IRGACURE® 184 and LUCIRIN® TPO) and complexing agent were added to the mixture and mixed for another 30 minutes.

TABLE IIa

Glass Bonding Compositions

| Components | 3 (wt %) | 4 (wt %) | 5 (wt %) |
|---|---|---|---|
| PHOTOMER ® 6019 | 10.2 | 32.6 | 20.4 |
| methacrylate terminated polyurethane block resin | 29.15 | 16.8 | 23.6 |
| 2-hydroxyethyl methacrylate | 11.7 | 6.7 | 9.4 |
| isobornyl methacrylate | 7.95 | 4.6 | 6.4 |
| hydroxypropyl methacrylate | 4.2 | 2.5 | 3.4 |
| isobornyl acrylate | 26.5 | 26.5 | 26.5 |
| acrylic Acid | 5.1 | 5.1 | 5.1 |
| glycidoxypropyltrimethoxy silane | 2.0 | 2.0 | 2.0 |
| IRGACURE ® 184 photoinitiator | 2.0 | 2.0 | 2.0 |
| LUCIRIN ® TPO photoinitiator[3] | 1.0 | 1.0 | 1.0 |
| complexing agent pre-mix | 0.2 | 0.2 | 0.2 |

[3]LUCIRIN ® TPO-diphenyl-2,4,6-triphenylbenzoyl phosphine oxide

TABLE IIb

Properties of Glass Bonding Compositions

| Property | 3 | 4 | 5 |
|---|---|---|---|
| Viscosity @ 25° C. (cps) | 4,500 | 3,400 | 2,500 |
| Color, APHA, uncured resin | 80–100 | 80–100 | 80–100 |
| YI, cured film (60 mils) | 5.3 | 4.6 | 4.3 |
| Fixture Time (sec) | 5 | 4–5 | 4–5 |
| Tensile Strength pin to glass, PSI | 2311 | 1899 | 2470 |
| Durability, % strength retention, 100 hours | 126 | 123 | 117 |
| Durability, % strength retention, 500 hrs | 100 | 124 | 87 |
| Torque Strength, ft-lb | 101 | 116 | 112 |

All samples were cured at 6 mw/cm², 365 nm for 40 seconds.

RH=relative humidity

The compositions illustrated in Table II exhibit good surface curing ability, fast cure speed and low color in the uncured and cured resins while maintaining superior durability. The compositions also exhibit superior tensile strength. The compositions were developed using the blend ratios of PHOTOMER® 6019 and block polyurethane resin mixture with isobornyl acrylate and combinations of IRGACURE® 184 and LUCIRIN® TPO initiators.

The above Examples and disclosure are intended to be illustrative and suggest many variations and alternatives to one of ordinary skill in this art, all of which are intended to be included within the scope of the claims. Those familiar with the art may recognize other equivalents to the specific embodiments described herein, which equivalents are also intended to be encompassed by the claims. The entire contents of all documents mentioned anywhere herein are expressly incorporated herein by reference.

What is claimed is:

1. A low intensity ultraviolet/visible light curable adhesive composition, comprising:
    a) an aliphatic polyether urethane acrylate component having an average of at least 2.5 acrylate groups per molecule;
    b) at least one of
        i) a combination of at least one aliphatic (poly)ester urethane diacrylate and at least one alkoxylated bisphenol A di(meth)acrylate; or
        ii) a urethane di(meth)acrylate of alkoxylated hydrogenated bisphenol A;
    c) a diluent (meth)acrylate ester component having an ambient viscosity of about 100–5,000 cps;
    d) optionally, an adhesion promoter component; and
    e) a photoinitiator component.

2. The composition of claim 1, wherein based on total composition weight,
    component a) is present in an amount of 5–75%;
    component b) is present in an amount of 5–70%;
    component c) is present in an amount of 5–60%;
    component d) is present in an amount of 0.2–30%; and
    component e) is present in an amount of 0.2–10%.

3. The composition of claim 1, wherein based on total composition weight, component b) comprises about 15% to about 50% by weight of an aliphatic polyester urethane diacrylate and about 5% to about 50% by weight of an alkoxylated bisphenol A di(meth)acrylate.

4. The composition of claim 1, wherein component b) comprises about 5% to about 50% by weight of a urethane diacrylate of hydrogenated bisphenol A.

5. The composition of claim 1, wherein the urethane diacrylate of hydrogenated bisphenol A is an aromatic urethane diacrylate of hydrogenated bisphenol A.

6. The composition of claim 1, wherein component a) is about 5% to about 40% by weight of at least one aliphatic polyether urethane acrylate having an average of at least 2.5 acrylate groups per molecule and component b) is about 10% to about 40% by weight of at least one urethane diacrylate of hydrogenated bisphenol A.

7. The composition of claim 1, wherein the weight ratio of component a) to component b) is from about 1:3 to about 3:1.

8. The composition of claim 1, wherein said weight ratio of component a) to component b) is about 1:1.

9. The composition of claim 1, wherein the photoinitiator is selected from the group consisting of benzophenones, acetophenones, chlorinated acetophenones, dialkoxyacetophenones, dialkylhydroxyacetophenone esters, benzoin, benzoin acetate, benzoin alkyl ethers, dimethoxybenzoin, dibenzylketone, benzoylcyclohexanol, aromatic ketones, aromatic acyloxime esters, acylphosphine oxides, acylphosphphonates, ketosulfides, dibenzoyldisulphides, diphenyldithiocarbonates, diphenyl (2,4,6-trmethylbenzoyl)phosphine oxides, and mixtures thereof.

10. The composition of claim 1, wherein said adhesion promoter is selected from the group consisting of acid functional monomer compounds, silane adhesion promoters, and mixtures thereof.

11. The composition of claim 1, wherein component d) comprises from about 1% to about 5% by weight of the composition of at least one acid functional monomer adhesion promoter, from about 1% to about 5% by weight of the composition of at least one silane adhesion promoter.

12. The composition of claim 1, wherein component c) comprises a liquid acrylate ester diluent or mixture thereof which is present in the composition in an amount of about 5% to about 30%.

13. The composition of claim 1, wherein component c) comprises a liquid methacrylate ester diluent or mixture thereof which is present in the composition in an amount of about 5% to about 25%.

14. The composition of claim 1, wherein the composition has a fixture time of less than about 5 seconds when exposed to ultraviolet radiation having an intensity of about 6 mw/cm2 at a wavelength of about 365 nm.

15. The composition of claim 1, wherein the cured composition has a yellow index of less than about 10.

16. The composition of claim 1, wherein the uncured composition has a Gardner Color of less than about 1.

17. The composition of claim 1, wherein the surface cure of said composition as measured at tack-free time is less than about 50 seconds at 50 mw/cm2 and a wavelength of 365 nm.

18. The composition of claim 1, wherein the composition has a torque strength durability on humidity aging at about 49° C. for 1 week of greater than about 80%.

19. The composition of claim 1, wherein the surface cure of said composition as measured at tack-free time is less than about 40 seconds when cured with UV light having an intensity of about 50 mw/cm2 at a wavelength of about 365 nm.

20. The composition of claim 1, further comprising a polymerization inhibitor.

21. The composition of claim 1, wherein the composition has an ultraviolet fixture time of less than about 5 seconds at about 5 mw/cm2 and 365 nm; a yellowness index of less than about 10 after cure; a Gardner Color of less than about 1 prior to cure; a torque strength of greater than about 70 foot-pounds; and a surface cure as measured at tack-free time of less than about 50 seconds at about 50 mw/cm2 and 365 nm.

* * * * *

UNITED STATES PATENT AND TRADEMARK OFFICE
CERTIFICATE OF CORRECTION

PATENT NO. : 6,596,787 B1
DATED : July 22, 2003
INVENTOR(S) : Susan Levandoski et al.

It is certified that error appears in the above-identified patent and that said Letters Patent is hereby corrected as shown below:

Column 6,
Line 15, change "isobomyl" to -- isobornyl --
Line 16, change "metbacrylate" to -- methacrylate --

Column 8,
Line 27, change "isobomyl" to -- isobornyl --

Signed and Sealed this

Twenty-fourth Day of August, 2004

JON W. DUDAS
*Director of the United States Patent and Trademark Office*